United States Patent [19]

Bradbury et al.

[11] Patent Number: 4,625,525

[45] Date of Patent: Dec. 2, 1986

[54] APPARATUS AND METHOD FOR PRODUCING FROSTED DRINKS

[75] Inventors: George Bradbury, 23921 Pinnacles Ct., Hayward, Calif. 94541; David Bradbury, Hayward, Calif.

[73] Assignee: Speciality Equipment Companies, Inc. Taylor Freezer Division, Rockton, Ill.; by said David Bradbury

[21] Appl. No.: 740,282

[22] Filed: Jun. 3, 1985

[51] Int. Cl.⁴ .............................................. F25D 13/00
[52] U.S. Cl. ........................................ 62/330; 62/340; 62/342; 62/390
[58] Field of Search ................... 426/524; 62/68, 342, 62/348, 389, 390, 394

[56] References Cited

U.S. PATENT DOCUMENTS

| | | | |
|---|---|---|---|
| 2,597,293 | 5/1952 | Coletti | 62/390 |
| 2,740,262 | 4/1956 | Stalkup | 62/342 X |
| 3,004,395 | 10/1961 | Morris, Jr. | 62/330 X |
| 3,045,441 | 7/1962 | Patch et al. | 62/68 |
| 3,665,722 | 5/1972 | Cornelius | 62/68 |
| 4,401,449 | 8/1983 | Martin et al. | 62/340 X |

Primary Examiner—Lloyd L. King
Attorney, Agent, or Firm—Flehr, Hohbach, Test, Albritton & Herbert

[57] ABSTRACT

Apparatus and method for producing frosted cocktails and other frosted drinks. The drinks consist of a slush containing a liquid, frozen crystals of the liquid and other ingredients. The slush is circulated continuously between a freezing station and a dispensing head, and the product is available for delivery in relatively large quantities at all times.

5 Claims, 1 Drawing Figure

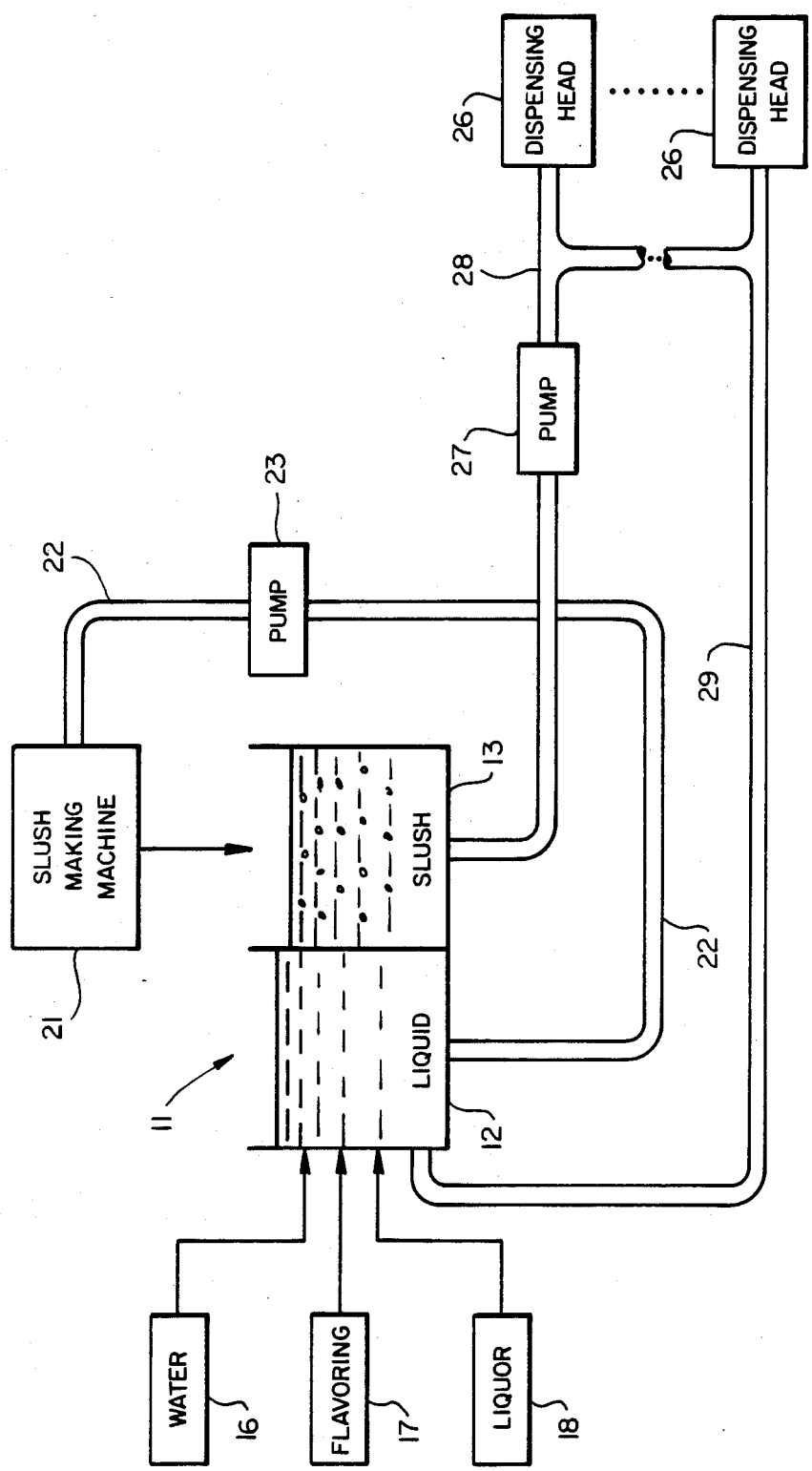

APPARATUS AND METHOD FOR PRODUCING FROSTED DRINKS

This invention pertains generally to drink making machines, and more particularly to apparatus and a method for producing and dispensing frosted drinks.

Heretofore, machines have been provided for making frosted drinks consisting of a slush of ice crystals mixed with a flavoring ingredient such as a fruit-flavored syrup. There have also been attempts to use such machines for making frosted cocktails such as margaritas, pina coladas, daiquiris and the like. These attempts have not been entirely successful, however, due to the relatively low capacity of the machines. The liquid to be frozen is generally delivered to the machine where it is frozen and held until it is dispensed. Such machines typically can hold only about one gallon of frozen product, and where a greater volume is required, e.g. in a large restaurant, a number of machines must be employed. These machines are relatively expensive, and although in at least one prior art installation the dispensing heads have been separated from the remainder of the machines, the machines are bulky and require a substantial amount of floor space.

It is in general an object of the invention to provide a new and improved apparatus and method for producing frosted drinks.

Another object of the invention is to provide an apparatus and method of the above character which are capable of producing frosted drinks in substantially greater volume than the machines heretofore provided.

These and other objects are achieved in accordance with the invention by freezing the liquid to make a slush at one station, delivering the slush to a dispensing head, and continuously circulating the slush between the first station and the dispensing head and refreezing any portion of the slush which is not dispensed.

The single FIGURE of drawing is a schematic diagram of one embodiment of apparatus for producing frosted drinks in accordance with the invention.

As illustrated in the drawing, the apparatus includes a refrigerated tank 11 which is divided into a liquid holding section 12 and a slush holding section 13. The tank can be of any suitable size, e.g. 100 gallons, and separate tanks can be provided for the liquid and the slush, if desired.

Water is supplied to tank 12 from a source 16 such as a pressurized supply line. Flavoring ingredients are delivered to tank 12 from a source 17, and alcoholic ingredients are supplied by a liquor source 18. The amounts of water and other ingredients delivered to the tank are determined by the drink to be made, and the delivery of these ingredients can be automated, if desired. The water and other ingredients can likewise be mixed together externally of the tank and delivered to the tank in a mixed form.

Liquid from tank 12 is delivered to a slush making machine 21 through line 22 by a pump 23. The slush making machine is of known design, and it freezes the liquid to form a slush which is delivered to slush holding tank 13.

Slush from tank 13 is delivered to dispensing heads 26 by a pump 27 and line 28. Any desired number of dispensing heads can be provided, and they can be located at one or more stations located remotely of the rest of the system. For example, the dispensing heads can be located at a bar or counter, and the remainder of the equipment can be located in a back room. Portions of the equipment, such as compressors for the refrigerated tanks and the slush making machine can even be located outside the building where the system is employed. The dispensing heads include valves (not shown) for dispensing the product, and any portion of the product which is not dispensed is returned to the liquid tank 12 by a line 29. Lines 28 and 29 are preferably insulated, but they do not need to be refrigerated.

Operation and use of the apparatus and therein the method of the invention can now be described. The ingredients for a desired drink are delivered to tank 12 and mixed together in liquid form. The liquid is delivered to slush making machine 21 where it is frozen to make a slush which is stored in tank 13. The slush from tank 13 is pumped continuously to dispensing heads 26, and any portion of the slush which is not dispensed is returned to tank 12. The returned slush is combined with the liquid in the tank, and returned to the slush making machine for refreezing and recirculation to the dispensing heads. The liquid and the slush circulate continuously, assuring that an adequate supply of product is available for delivery at all times.

The invention has a number of important features and advantages. It enables a large quantity of frosted drinks to be produced by one relatively small slush making machine and served instantaneously. The cost of this system is substantially less than that of prior art systems which required a separate slush making machine for each dispensing head and had only a limited quantity of product available at each head. With the invention, for example, a single slush making machine having a capacity of only one gallon can deliver 50–100 gallons of product in a relatively short time.

It is apparent from the foregoing that a new and improved apparatus and method for producing frosted drinks have been provided. While only certain presently preferred embodiments have been described in detail, as will be apparent to those familiar with the art, certain changes and modifications can be made without departing from the scope of the invention as defined by the following claims.

We claim:

1. In apparatus for producing frosted drinks: a first tank for holding a liquid, a second tank for holding a slush, slush making means which receives liquid from the first tank and freezes the liquid to form a slush which is delivered to the second tank, said second tank having a capacity substantially greater than the output of the slush making machine so that the slush can accumulate in the second tank, a dispensing head, and means for continuously circulating the slush from the second tank to the dispensing head and from the dispensing head to the first tank.

2. The apparatus of claim 1 wherein the dispensing head is located remotely of the tanks and the slush making means.

3. The apparatus of claim 1 including means for adding an alcoholic ingredient and a flavoring ingredient to the liquid in the first tank.

4. In apparatus for producing a frosted drink: a liquid holding tank, means for freezing the liquid to form a slush, means for delivering the liquid from the liquid holding tank to the freezing means, a slush holding tank having a capacity substantially greater than the freezing means for collecting the slush as it is formed, a dispensing head, and means for continuously circulating the slush from the slush holding tank to the dispensing head and from the dispensing head to the liquid holding tank.

5. The apparatus of claim 4 including means for adding an alcoholic ingredient and a flavoring ingredient to the slush.

* * * * *